United States Patent
Vogt et al.

[11] Patent Number: 6,131,546
[45] Date of Patent: Oct. 17, 2000

[54] METHOD AND ARRANGEMENT FOR OPERATING AN INTERNAL COMBUSTION ENGINE

[75] Inventors: Bernhard Vogt, Böblingen; Werner Hess, Stuttgart, both of Germany

[73] Assignee: Robert Bosch GmbH, Stuttgart, Germany

[21] Appl. No.: 09/252,032

[22] Filed: Feb. 18, 1999

[30] Foreign Application Priority Data

Feb. 18, 1998 [DE] Germany .................... 198 06 665

[51] Int. Cl.[7] .............. F02D 43/04; F02D 41/00
[52] U.S. Cl. .............. 123/406.23; 123/339.14; 123/436
[58] Field of Search .............. 123/406.23, 406.53, 123/406.55, 179.18, 339.11, 339.14, 399, 436, 329

[56] References Cited

U.S. PATENT DOCUMENTS

| | | | |
|---|---|---|---|
| 4,437,442 | 3/1984 | Yamaguchi | 123/329 |
| 5,010,863 | 4/1991 | Ishida et al. | 123/179.18 |
| 5,445,124 | 8/1995 | Tomisawa et al. | 123/339.11 |
| 5,484,351 | 1/1996 | Zhang et al. | 477/113 |
| 5,495,835 | 3/1996 | Ueda | 123/339.11 |
| 5,619,967 | 4/1997 | Streib | 123/399 |
| 5,765,527 | 6/1998 | Lehner et al. | 123/339.1 |
| 6,000,376 | 12/1999 | Hess et al. | 123/406.23 |

FOREIGN PATENT DOCUMENTS 3111652  5/1991  Japan.

*Primary Examiner*—Henry C. Yuen
*Assistant Examiner*—Hieu T. Vo
*Attorney, Agent, or Firm*—Walter Ottesen

[57] ABSTRACT

A method for operating an internal combustion engine of a motor vehicle with the engine developing a torque during the operation thereof includes deriving a desired value of the torque of the engine from operating variables. The desired value of the torque is made available by at least adjusting the air supply and the ignition angle of the engine. The efficiency of the engine is deteriorated in at least one operating state of the engine compared to the efficiency in operating states outside of the one operating state by retarding the ignition angle and increasing the air supply whereby the torque developed by the engine remains essentially constant. The presence of the one operating state is detected when a startup intent of the driver of the vehicle is recognized.

12 Claims, 3 Drawing Sheets

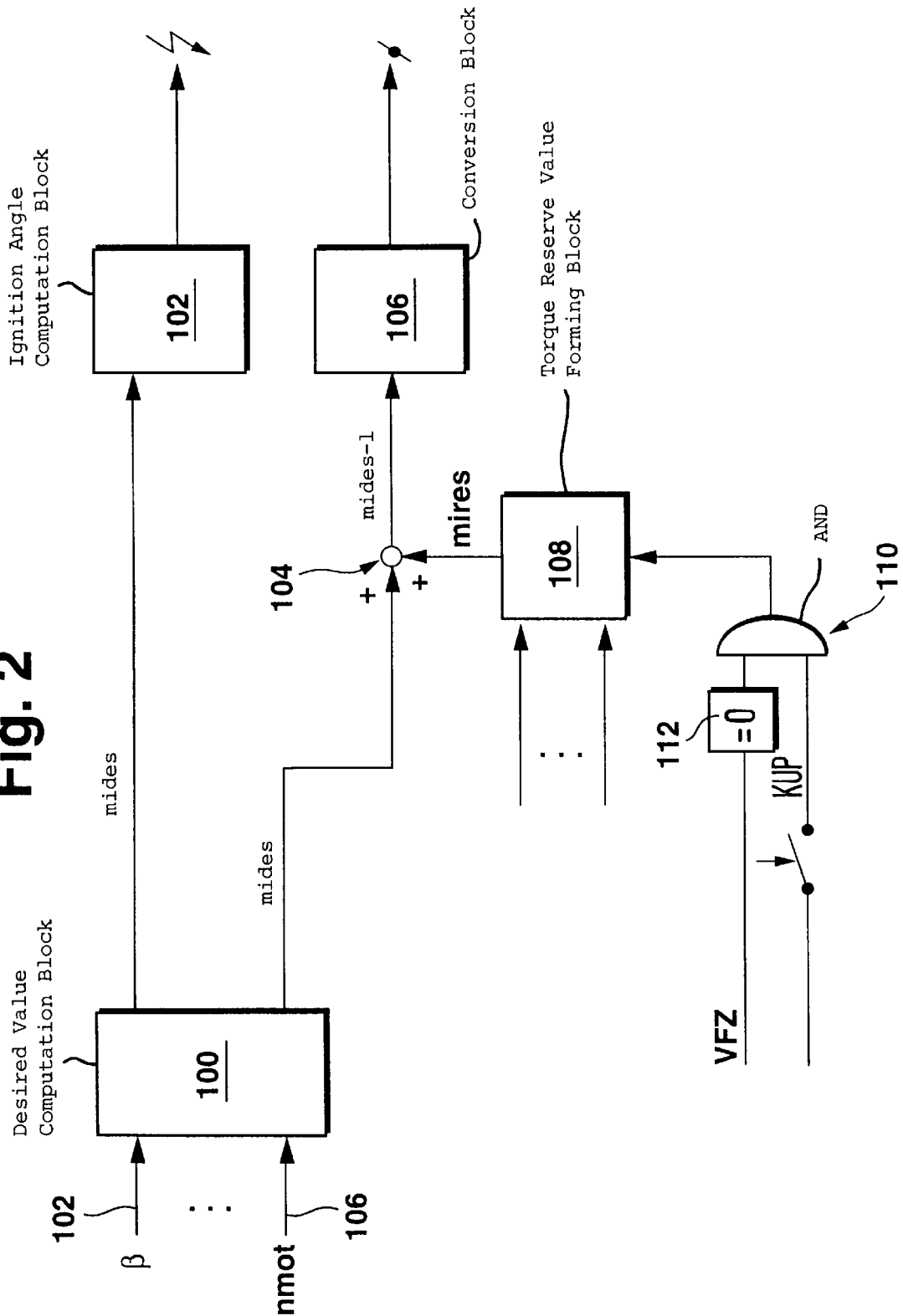

METHOD AND ARRANGEMENT FOR OPERATING AN INTERNAL COMBUSTION ENGINE

BACKGROUND OF THE INVENTION

In modern control systems for internal combustion engines, the power of the engine and especially the torque thereof is controlled via electric paths in dependence upon at least one input value. This input value can be a driver command derived from the position of an operator-controlled element actuable by the driver. An example of such a control system is disclosed in U.S. patent application Ser. No. 09/983,090, filed on Jan. 12, 1998, which corresponds to International patent publication WO-A 97/43531. There, a desired torque value of the engine is determined in dependence upon the driver command. The power variables of the engine such as air input, fuel input and ignition angle are controlled in dependence upon this desired torque value so that the actual torque of the engine corresponds to the desired torque. In the normal case, the target is to adjust the control variables with the objective of an optimal torque of the engine so that the engine can operate at high efficiency. This means that, for example, the ignition angle adjustment must be located always close to the optimal ignition angle.

In some operating states, for example, in idle, it can, however, be desirable to deteriorate the efficiency of the engine and to select the ignition angle shift so that the control of the torque is possible exclusively via the ignition angle in both directions, that is, to increase torque and to decrease torque. Since the total torque should not change, the air supply to the engine is correspondingly increased in this operating state. The extent of the deterioration of efficiency is determined by a so-called torque reserve value which is an index for the maximum possible change of the torque via the ignition angle adjustment in the sense of increasing the ignition angle.

With this measure, the dynamic and precision of the torque control is improved in the operating states mentioned there, namely, idle, start and for active catalytic converter heating.

SUMMARY OF THE INVENTION

It is an object of the invention to provide measures with which the dynamic of moving the vehicle from standstill to a given speed is improved. This action of moving the vehicle from standstill to a given speed is hereinafter referred to by the term "startup".

The method of the invention for operating an internal combustion engine of a motor vehicle with the engine developing a torque during the operation thereof. The method includes the steps of: detecting operating variables of the engine and/or the vehicle and deriving a desired value of the torque of the engine from the operating variables; making the desired value of the torque available by at least adjusting the air supply and the ignition angle thereof; deteriorating the efficiency of the engine in at least one operating state thereof compared to the efficiency in operating states outside of the at least one operating state by retarding the ignition angle and increasing the air supply whereby the torque developed by the engine remains essentially constant; and, detecting the presence of the one operating state when a startup intent of the driver of the vehicle is recognized.

A significantly improved startup performance is achieved by making available or increasing an already made-available torque reserve for a startup operation. A reduced tendency to stall is provided because a very rapid coupling with corresponding dynamic accelerator pedal actuation is controllable by a rapid shift of the ignition angle in the sense of increasing torque.

It is especially advantageous that a rapid torque buildup takes place via clutch engagement because of the readiness or increase of the torque reserve. This is so because the shift of ignition angle more rapidly increases the torque than the corresponding increase of the air supply.

Sharp drops in rpm are countered in an especially advantageous manner during coupling. This is so because the rapid ignition angle adjustment counters abrupt drops in rpm.

BRIEF DESCRIPTION OF THE DRAWINGS

The invention will now be described with reference to the drawings wherein:

FIG. 2 is a sequence block diagram which shows the realization of the improvement of the startup operation as a program of a microcomputer; and, FIGS. 3a to 3e are time-dependent diagrams which show the startup operation of a vehicle utilizing the measures described herein.

DESCRIPTION OF THE PREFERRED EMBODIMENTS OF THE INVENTION

Figure 1:
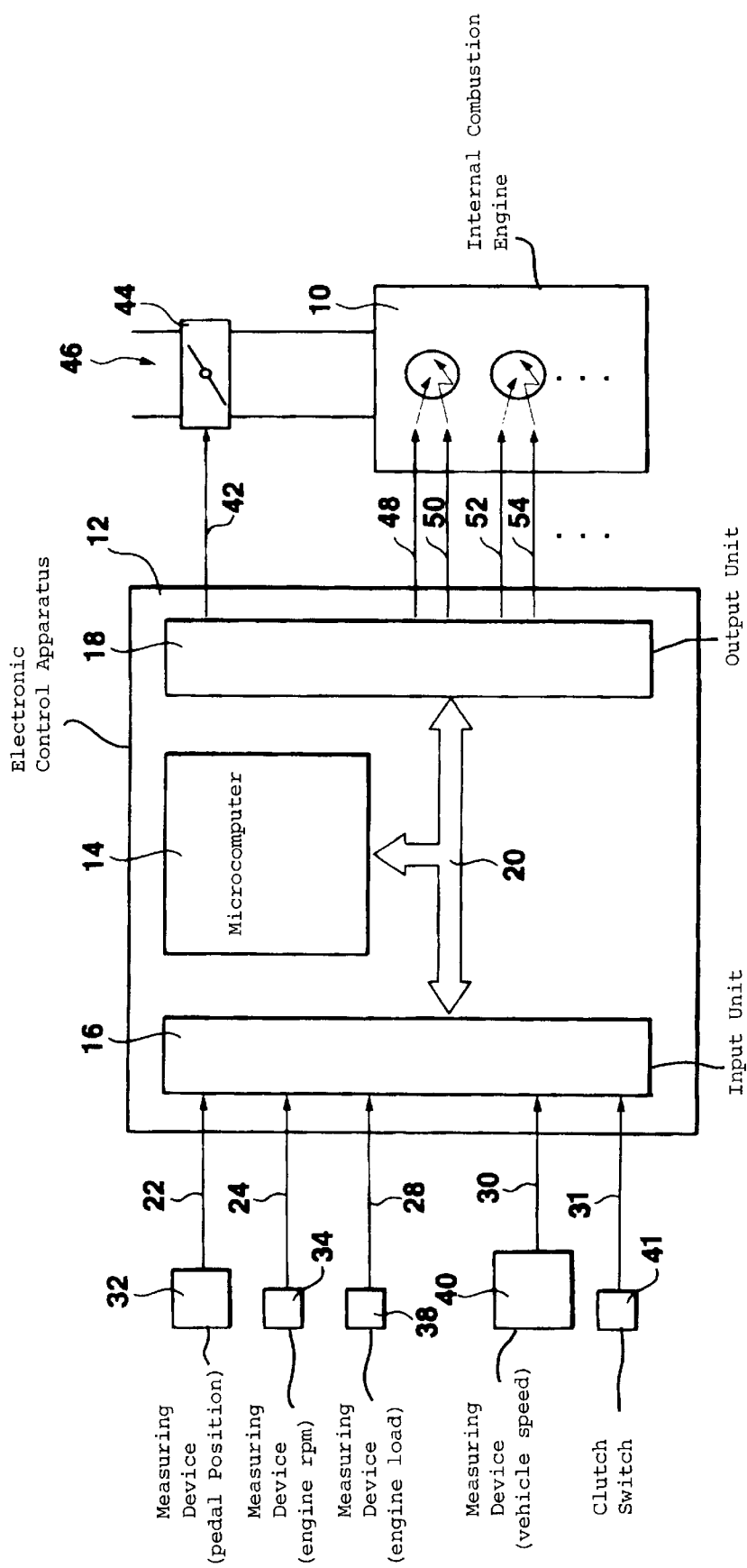
FIG. 1 is a schematic block diagram of a control arrangement for a multicylinder internal combustion engine.

In FIG. 1, a control arrangement for a multicylinder internal combustion engine 10 is shown. The control arrangement includes an electronic control apparatus 12 which comprises at least one microcomputer 14, an input unit 16 and an output unit 18. Input unit 16, output unit 18 and microcomputer 14 are coupled to each other via a communication system 20 for mutual data exchange. Input lines 22, 24, 28, 30 and 31 lead to the input unit 16. The line 22 originates at a measuring device 32 for detecting the accelerator pedal position and the line 24 is from a measuring device 34 for detecting the engine rpm. The line 28 comes from a measuring device 38 for detecting engine load (air quantity, air mass, intake manifold pressure, et cetera). A measure for the vehicle speed is supplied to the control unit 12 from a corresponding measuring device 40 via line 30. This measure is either measured or computed in the context of another control unit (for example, the control unit for a drive-slip control, for a transmission control, et cetera) or is made available directly by the control unit 12 while evaluating wheel rpm signals which are supplied via line 30. In addition, the state of the clutch switch 41 is supplied via the input line 31.

In a preferred embodiment, the clutch switch 41 is closed when the clutch is actuated and is opened when the clutch pedal is released. In addition to the operating variables shown, the control apparatus detects further variables essential for engine control such as the engine temperature, the exhaust-gas composition, et cetera.

An output line 42 is connected to the output unit 18 and leads to an electrically actuable throttle flap 44 which is mounted in the intake system 46 of the engine. Also, output lines 48, 50, 52, 54, et cetera are shown, which are connected to actuators for fuel metering in each cylinder of the engine 10 or for adjusting the ignition angle for each cylinder.

In the preferred embodiment, the control apparatus 12 (there, the microcomputer 14) derives a desired torque of the engine from the position of the accelerator pedal in a manner known per se. This desired torque is adjusted by a corresponding control of the power variables of the engine such as air supply, fuel metering or ignition angle. In normal operation of the engine, this adjustment is undertaken in such a manner that the ignition angle is as close as possible to a value which defines a maximum torque of the engine. At this operating point, the engine operates with its highest efficiency. As shown by the state of the art, this efficiency is deteriorated in specific operating states in that the ignition angle is advanced by a pregiven value and the air supply is increased so that the torque of the engine remains essentially constant. Operating states of this kind are idle, the warm-up of the engine (catalytic converter heating), et cetera. In these operating states, a torque reserve value is formed which leads to a shift of the ignition angle so that the magnitude of the torque reserve value can be made available by changing the ignition angle also in a direction for increasing torque.

In a specific embodiment, this is realized in that two different torque desired values are formed for the air supply setting and for the ignition angle setting. The desired value for the ignition angle setting corresponds to the torque desired value derived, inter alia, from the driver command; whereas, the desired torque value for the air supply setting defines a desired value formed from this desired value and the torque reserve value. In this way, an increase of the air supply takes place, which automatically leads to a retardation of the ignition angle. This occurs because the torque of the engine is guided via the ignition angle setting to the desired value provided there. According to the invention, and to improve the startup operation, this torque reserve is made available also for a startup operation or, when a torque reserve has already been formed, it is changed for the startup operation and is especially increased.

The startup operation is determined in various ways. In the preferred embodiment, the startup operation is determined when, for a vehicle at standstill (vehicle speed 0 or less than a minimum value), the clutch pedal is actuated. In other embodiments, the startup operation can be determined in another way, for example, for an actuated clutch and a depressed accelerator pedal, when the clutch is actuated and the gear engaged, et cetera. What is decisive is that the checked criteria must provide an indication which points to a subsequent startup command of the driver. In automatic transmissions, the release of the brake can also be applied.

In addition to or as an alternative to the adjustment of the ignition angle, an intervention in the fuel metering can be made to form the torque reserve in other embodiments. This can be done, for example, by changing the mixture composition or by inhibiting or disabling individual cylinders.

A corresponding procedure for the preferred embodiment is shown in the sequence diagram of FIG. 2.

In a desired value computation block 100, a desired value mides for the torque of the engine is formed in dependence upon operating variables (accelerator pedal position β, rpm Nmot, et cetera) utilizing characteristic fields, characteristic lines, tables and/or computation steps in accordance with the above-mentioned state of the art. The desired value mides is supplied, on the one hand, to an ignition angle computation block 102 and, on the other hand, to a logic element 104. The ignition angle computation block 102 forms a corrective value for the torque-optimal ignition angle which leads to the actual torque approaching the desired torque. This corrective value is formed in dependence on the desired value mides and upon an actual torque value formed on the basis of operating variables such as engine load and engine rpm. In normal operation, the set ignition angle in the steady-state case is as close as possible to the optimal ignition angle. In addition, the fuel metering can also be adjusted in computation block 102.

In the logic element 104, the desired value mides and the torque reserve value mires are superposed (for example, added). The sum defines the torque desired value mides-1 for the air path. This is converted in block 106 into a drive signal for the throttle flap of the engine while considering the engine rpm, engine load, et cetera.

The torque reserve value mires is formed in block 108. In one embodiment, the torque reserve value mires is read out of a read-only-memory (ROM) when the provided operating conditions are present. In other embodiments, the torque reserve value mires is formed by means of characteristic lines or characteristic fields in dependence upon rpm or in dependence upon other operating variables when the corresponding operating condition is present. In addition, a torque reserve value is formed when a startup intent of the driver is recognized. The reserve value can also be dependent upon operating variables such as engine rpm, engine temperature, et cetera. In one embodiment, the reserve value is here too determined from a characteristic line, a characteristic field or a table.

The startup operation proceeds from idle. For this reason, and according to another embodiment, when a startup intent of the driver is present, the torque reserve value, which is provided for idle, is increased, for example, in that a predetermined offset value is superposed on the torque reserve value determined for idle. A startup intent of the driver is recognized in the AND connection 110 in the preferred embodiment. The signal KUP of a clutch switch is supplied to the AND connection 110 and this signal is positive when the clutch switch is closed (clutch pedal actuated) and is 0 when the clutch switch is opened. Furthermore, a signal is supplied to the AND connection 110 when it is detected in a comparison operation 112 that the vehicle speed is 0 or drops below a minimum value; that is, the vehicle is at standstill. If both these conditions are present, the torque reserve value computation is advised that a startup intent of the driver is present. The reserve value for the startup operation is therefore made available or the already existing reserve torque value is increased. If no startup intent is recognized, the reserve value of the torque is reduced and this is done abruptly or in the context of a pregiven time-dependent ramp depending upon the embodiment.

Figure 3A:
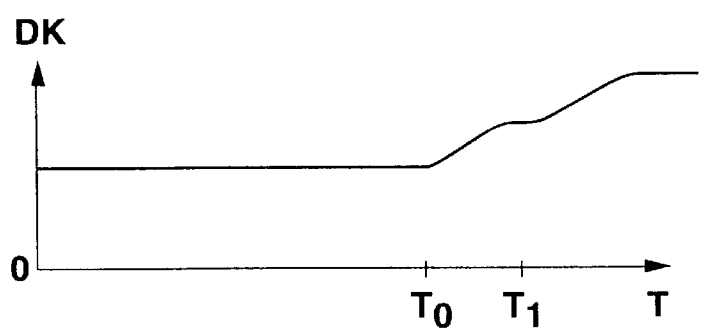
Figure 3B:
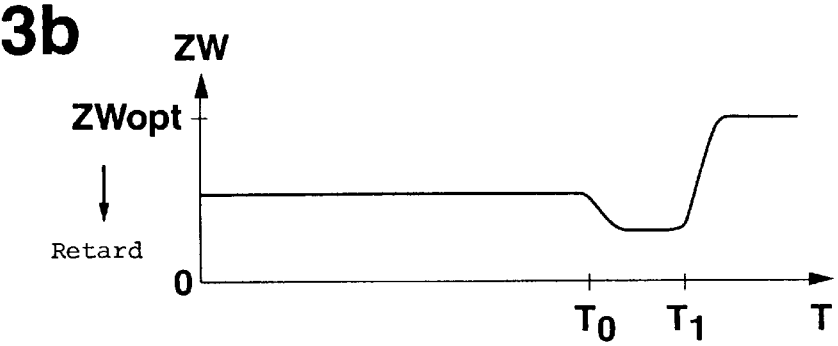
Figure 3C:
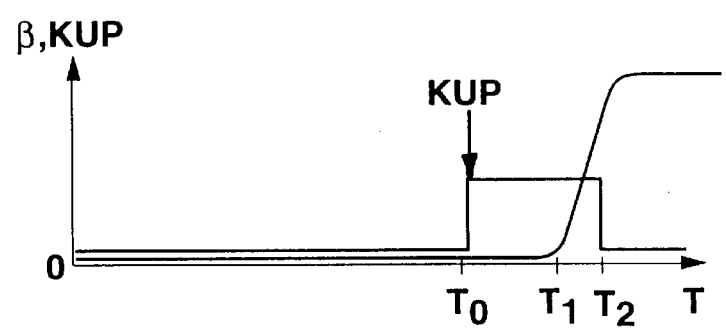
Figure 3D:
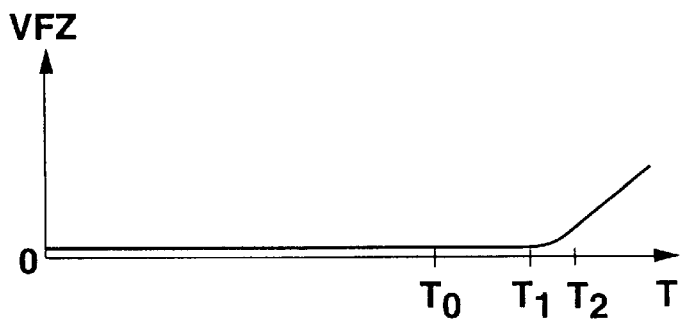
Figure 3E:
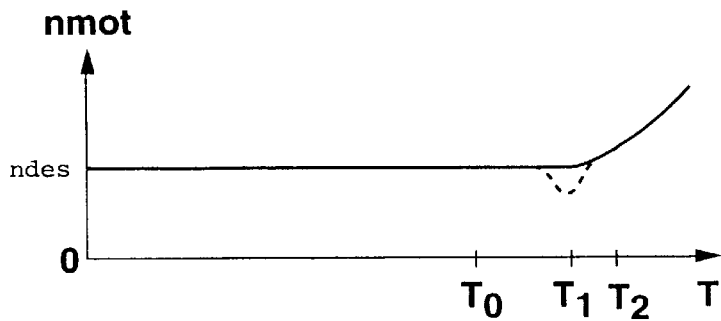

In FIGS. 3a to 3e, time diagrams are presented which show the operation of the preferred embodiment. In FIG. 3a, the position of the throttle flap DK and therefore the air supply to the engine as a function of time are shown. In FIG. 3b, the time-dependent trace of the ignition angle setting ZW is presented and, in FIG. 3c, the time-dependent trace of the accelerator pedal position β and the clutch switch state KUP is shown. FIG. 3d shows the time-dependent trace of the vehicle speed VFZ and FIG. 3e shows the time-dependent trace of the engine rpm Nmot.

The vehicle is in the idle state up to time point $T_0$. The accelerator pedal is released (see FIG. 3c, β) and the clutch pedal is not actuated (clutch switch KUP 0). The vehicle speed in this operating state is 0 (see FIG. 3d). The adjustment of the engine in the sense of maintaining a pregiven rpm (FIG. 3e, ndes) is carried out by setting the air supply DK and the ignition angle ZW. A predetermined torque reserve mires is built in, that is, the ignition angle is shifted to retard compared to its optimal value ZWOPT. The driver actuates the clutch pedal at time point $T_0$. The clutch switch outputs a positive signal ab (see FIG. 3c) when closed. The startup intent of the driver is recognized because the vehicle speed continues to be 0 at the time of time point $T_0$. This leads to an increase of the air supply and to a further adjustment of the ignition angle in the retard direction (see FIGS. 3a and 3b). Stated otherwise, the torque reserve is increased.

Shortly before time point $T_1$, the driver actuates the accelerator pedal, whereupon the driver releases the pedal at time point $T_1$; that is, the startup operation is completed (see FIG. 3c). The driver announces a torque command by actuating the accelerator pedal at time point $T_1$. Correspondingly, the ignition angle and throttle flap position are shifted starting at time point $T_1$ to realize the torque command. The ignition angle is especially shifted to its optimal value in order to accommodate the rapidly changed driver command. The air supply is likewise increased to increase torque in the context of its dynamic possibilities in correspondence to the driver command (see FIG. 3a). After time point $T_1$, the vehicle speed increases in accordance with FIG. 3d and the engine rpm increases in accordance with FIG. 3e. Glitches or abrupt drops in rpm, as they can take place without the torque reserve (see FIG. 3e, broken line), can be effectively avoided.

It is understood that the foregoing description is that of the preferred embodiments of the invention and that various changes and modifications may be made thereto without departing from the spirit and scope of the invention as defined in the appended claims.

What is claimed is:

1. An arrangement for operating an internal combustion engine of a motor vehicle with said engine developing a torque during the operation thereof, the arrangement comprising:

means for detecting operating variables of at least one of said engine and said vehicle;

a control apparatus including means for receiving said operating variables and for deriving a desired value of said torque therefrom;

said control apparatus further including means for determining at least one predetermined operating state and for deteriorating the efficiency of said engine in said one operating state by increasing the air supply and shifting the ignition angle in direction to retard said ignition angle; and, said control apparatus further including means for detecting said one operating state when a startup intent of the driver of the vehicle is recognized from at least one of the following: when said driver actuates the clutch of said vehicle while said vehicle is at standstill or when said driver releases the brake of said vehicle.

2. An arrangement for operating an internal combustion engine of a motor vehicle with said engine developing a torque during the operation thereof, the arrangement comprising:

means for detecting operating variables of at least one of said engine and said vehicle;

a control apparatus including means for receiving said operating variables and for deriving a torque desired value (mides) of said torque therefrom;

said control apparatus further including means for determining a torque reserve value (mires);

means for forming a torque desired value (mides_1) for the air path on the basis of said torque desired value (mides) and said torque reserve value (mires) when a start up intent of said driver is recognized; and, means for adjusting the air supply to said engine in dependence upon said torque desired value (mides_1) for said air path and for adjusting the ignition angle in dependence upon said torque desired value (mides).

3. A method for operating an internal combustion engine of a motor vehicle with said engine developing a torque during the operation thereof, the method comprising the steps of:

detecting operating variables of at least one of said engine and said vehicle and deriving a torque desired value (mides) of said torque of said engine from said operating variables;

determining a torque reserve value (mires);

forming a torque desired value (mides_1) for the air path on the basis of said torque desired value (mides) and said torque reserve value (mires) when a start up intent of said driver is recognized; and, adjusting the air supply to said engine in dependence upon said torque desired value (mides_1) for said air path and adjusting the ignition angle in dependence upon said torque desired value (mides).

4. A method for operating an internal combustion engine of a motor vehicle with said engine developing a torque during the operation thereof, the method comprising the steps of:

detecting operating variables of at least one of said engine and said vehicle and deriving a desired value of said torque of said engine from said operating variables;

making said desired value of said torque available by at least adjusting the air supply and the ignition angle thereof;

deteriorating the efficiency of said engine in at least one operating state thereof compared to the efficiency in operating states outside of said at least one operating state by retarding the ignition angle and increasing the air supply whereby said torque developed by said engine remains essentially constant; and, detecting the presence of said one operating state when a startup intent of the driver of the vehicle is recognized from at least one of the following: when said driver actuates the clutch while said vehicle is at standstill or when said driver releases the brake of said vehicle.

5. The method of claim 1, wherein a deterioration of the efficiency of said engine occurs in the idle operating state.

6. The method of claim 5, comprising the further step of further deteriorating said efficiency in said idle operating state when said driver intent is recognized.

7. The method of claim 6, comprising the further step of determining said driver intent on the basis of at least one of the following: accelerator pedal position, transmission setting, and/or brake pedal actuation.

8. The method of claim 7, superposing a pregiven reserve torque value onto said desired value of said torque for the adjustment of the air supply to cause said deterioration of said efficiency.

9. The method of claim 5, wherein said reserve torque value is dependent upon operating variables of said engine.

10. The method of claim 5, comprising the further steps of:

determining said torque reserve value during idle in dependence upon operating variables including engine rpm; and, increasing said torque reserve value when said startup intent is recognized.

11. The method of claim 10, comprising the further step of superposing an offset value onto said torque reserve value during said idle operating state.

12. The method of claim 11, wherein said offset value is dependent upon operating variables of said engine.

* * * * *